(12) United States Patent
Anderson et al.

(10) Patent No.: US 12,037,022 B2
(45) Date of Patent: Jul. 16, 2024

(54) ROOF-TOP AUTONOMOUS VEHICLE CONTROL SYSTEM

(71) Applicant: Ridecell, Inc., San Francisco, CA (US)

(72) Inventors: Matthew Francis Anderson, San Quentin Village, CA (US); Richard Huy Ho, Westminster, CA (US)

(73) Assignee: Ridecell, Inc., San Francisco, CA (US)

( * ) Notice: Subject to any disclaimer, the term of this patent is extended or adjusted under 35 U.S.C. 154(b) by 0 days.

(21) Appl. No.: 18/119,500

(22) Filed: Mar. 9, 2023

(65) Prior Publication Data
US 2023/0322265 A1    Oct. 12, 2023

Related U.S. Application Data

(63) Continuation of application No. 16/830,755, filed on Mar. 26, 2020, now Pat. No. 11,608,082.

(60) Provisional application No. 62/824,736, filed on Mar. 27, 2019.

(51) Int. Cl.
*B60W 60/00*   (2020.01)
*B60R 11/04*   (2006.01)
*B60R 11/00*   (2006.01)

(52) U.S. Cl.
CPC ........ *B60W 60/0025* (2020.02); *B60R 11/04* (2013.01); *B60R 2011/004* (2013.01); *B60R 2011/005* (2013.01); *B60R 2011/008* (2013.01); *B60W 2420/403* (2013.01); *B60W 2420/408* (2024.01); *B60W 2422/00* (2013.01); *B60W 2556/45* (2020.02)

(58) Field of Classification Search
CPC ........ B60W 60/0025; B60W 2420/42; B60W 2420/52; B60W 2422/00; B60W 2556/45; B60R 11/04; B60R 2011/004; B60R 2011/005; B60R 2011/008
See application file for complete search history.

(56) References Cited

U.S. PATENT DOCUMENTS

| | | | |
|---|---|---|---|
| 2017/0305360 A1* | 10/2017 | Zajac | B60R 11/04 |
| 2018/0265019 A1* | 9/2018 | Dry | B60R 16/0231 |
| 2019/0250016 A1* | 8/2019 | Krishnan | B60R 11/00 |
| 2019/0315409 A1* | 10/2019 | Ghannam | B60R 11/00 |
| 2020/0023788 A1* | 1/2020 | Frederick | G01S 7/02 |
| 2020/0101905 A1* | 4/2020 | Taylor | B60R 9/04 |

* cited by examiner

*Primary Examiner* — Shon G Foley
(74) *Attorney, Agent, or Firm* — Larry E. Henneman, Jr.; Henneman & Associates, PLC

(57) ABSTRACT

A novel roof-top autonomous vehicle control system for converting a non-autonomous vehicle into an autonomous vehicle includes a weatherproof housing that removably attaches to the roof of a host vehicle. The housing supports modular attachment of various sensors, receivers, computers, and other electrical components that can be installed, removed, and/or interchanged without disrupting the initial calibration thereof. In a particular embodiment, various internal electrical components of the system are mounted on a tray which can be mounted in, and removed from, the housing without disrupting the initial calibration of the various sensors. In a more particular embodiment, the housing includes a plurality of removable panels and windows that provide access to the inside of the housing.

20 Claims, 19 Drawing Sheets

Table A: List of Electronics

| Part Name | Location | Qty: | Notes |
|---|---|---|---|
| Velodyne Lidar 32C | Exterior, center | 1 | Height adjustability - 5 in. |
| Velodyne Lidar 16 | Exterior, Left & Right | 2 | Pitch adjustability +/- 15° |
| Lidar Electronics | Interior | 3 | Polycase - LP-41BFMB1 |
| CraddlePoint LTE Unit | Interior | 1 | Spec. CAD in STEP file |
| SwiftNav Unit | Interior | 1 | Spec. CAD in STEP file |
| Antenna, Swiftnav | Exterior | 1 | 150° sky line of sight |
| Antenna 5 in 1 | Exterior | 1 | Installation Guide |
| Camera, Wide | Interior, front panel | 1 | Pointgrey Blackfly, 105° |
| Camera, Narrow | Interior, front panel | 2 | Pointgrey Blackfly, 60° |
| Computer, Nuvo | Interior | 1 | Power requirement (250W) Spec Manual |
| Ethernet Switch Netgear | Interior | 1 | CAD |
| USB3 Hub | Interior | 1 | TBD |

FIG. 9

ROOF-TOP AUTONOMOUS VEHICLE CONTROL SYSTEM

CROSS-REFERENCE TO RELATED APPLICATIONS

This application is a continuation of co-pending U.S. patent application Ser. No. 16/830,755, filed on Mar. 26, 2020 by at least one common inventor, which claims the benefit of U.S. Provisional Patent Application Ser. No. 62/824,736, filed on Mar. 27, 2019 by at least one common inventor and entitled "Roof-Top Autonomous Vehicle System", both of which are incorporated by reference herein in its entirety.

BACKGROUND OF THE INVENTION

Field of the Invention

This invention relates generally to automobiles, and more particularly to autonomous automobiles.

Description of the Background Art

Autonomous vehicle technology is currently on the rise. Rather than transforming existing non-autonomous models into fully autonomous vehicles, automotive companies are slowly adding more and more low level autonomous systems to existing models. The end goal is to ultimately create fully autonomous vehicles that require little to no input from a driver.

Many perfectly functioning automobiles on the road today were designed and manufactured before autonomous systems were a feasible option. Consequently, these vehicles cannot take advantage of the benefits offered by autonomous systems, without significant modification. Another challenge with the state-of-the-art is that autonomous systems are typically an integral part of the vehicle. As a result, consumers cannot remove such systems from the vehicle. In addition, when integrated within a vehicle, it is a challenge to get the best performance from many of the components (e.g., optical sensors, antennas, lights, etc.) of the autonomous system. This also creates the problem of having to design different custom parts (e.g., roof structures, body structures, roof mounts, etc.) for every different vehicle model, or requires invasive modifications of existing models.

What is needed, therefore, is a system for converting a non-autonomous vehicle into an autonomous vehicle. What is also needed is an autonomous system that is removable from a vehicle and leaves the vehicle in its original state (e.g., no noticeable signs of prior modification). What is also needed is an autonomous system that can be interchanged between different automobile models. What is also needed is a modular autonomous system.

SUMMARY

The present invention overcomes the problems associated with the prior art by providing a means of converting a non-autonomous vehicle to an autonomous vehicle. The invention facilitates converting a wide variety of non-autonomous vehicles to autonomous vehicles, without significantly modifying the vehicles. Among other advantages, the ability to convert non-autonomous vehicles to autonomous vehicles, without significantly modifying the vehicles, makes it much more practical to loan/rent autonomous control systems, when an autonomous vehicle is required for a limited period of time.

An autonomous vehicle control system for converting a host non-autonomous vehicle to an autonomous vehicle is disclosed. The example autonomous vehicle control system includes a housing, a set of sensors, an electronic control system, and an interface. The housing includes a mount, which is configured to removably attach the housing to the exterior of a host vehicle. The set of sensors is coupled to the housing. A first sensor of the set of sensors is configured to sense at least one physical aspect of the host vehicle's driving environment and to provide sensor output corresponding to the at least one physical aspect of the host vehicle's driving environment. The electronic control system is disposed in the housing and is configured to receive the sensor output and to generate vehicle control instructions based at least in part on the sensor output. The interface is configured to communicate the vehicle control instructions from the electronic control system to a control module of the host vehicle. The vehicle control instructions are configured to control movement of the host vehicle.

A particular example autonomous vehicle control system additionally includes a tray. In the example systems, the tray is configured to be removably mounted in the housing, and the electronic control system is mounted to the tray. The electronic control system remains mounted to the tray when the tray is removed from the housing. The first sensor can be a LiDAR sensor, and the first sensor can remain mounted to the housing when the tray is removed from the housing. As another example, the first sensor can be a camera, and the first sensor can remains mounted to the tray when the tray is removed from the housing.

In an example system, the autonomous vehicle control system is a modular system having at least one physical interface configured to receive a plurality of different sensors. For example, a first sensor can be a LiDAR sensor, and a second sensor can be a camera.

In addition, the example autonomous vehicle control systems can further include an antenna set mounted to the housing and electrically connectable to the electronic control system. The antenna set can include one or more positioning antennas and one or more communications antennas.

In an example autonomous vehicle control system, the mount includes a plurality of legs (sometimes referred to herein as arms) extending outward and downward from a central portion of the housing to suspend the housing over the roof-top of the host vehicle. The mount is adjustable to facilitate mounting the housing on a plurality of different vehicle models.

An example autonomous vehicle control system can additionally include a wireless communication device and a positioning device. The electronic control system can be configured to wirelessly communicate with control systems of other autonomous vehicles and/or a traffic control/information system.

Features of the present invention bring the benefits of autonomous mobility to reality faster, by enabling low-speed, self-driving, first and last-mile use cases to solve the real-world problems of today. Examples include, but are not limited to, mobility for elderly people, last-mile connectivity from transit stations, and night-time safe rides for university students.

Test vehicles currently utilize, for example, rooftop structures built from 80/20 T-slotted aluminum extrusions, mounted to standard Yakima roof rack feet. These initial structures have been helpful in gathering initial data, but early example systems have limitations. Therefore, a roof-mounted sensor unit which not only addresses the current limitations, but also allows for scalability in the near future, has been developed.

An industrial design concept has been created for a roof-mounted sensor unit that serves the purpose of mounting sensors, antennas, lights, and cameras. Additionally, the sensor unit provides a waterproof enclosed area that electronics associated with sensing can be housed and supported. The sensor unit can be structurally mounted to, for example, a Ford Fusion vehicle at four points using standard Yakima rack feet along the left and right edges of the roof. The sensor unit was designed to carefully avoid blocking the LiDAR paths, and is also an aesthetically pleasing design element of the autonomous vehicle and is complementary to product styling.

The present invention overcomes the problems associated with the prior art by providing a single universal autonomous system having several modular elements that can be exchanged and adapted to accommodate multiple vehicle models. The system includes, but is not limited to, sensors, computer(s), networking capabilities, power supplies, and so on.

In one embodiment of the present invention, the autonomous system includes a main body enclosure, a modular gear tray inside, three sensor mounts on top, and four modular arms that each hold a sensor mount and connect to the vehicle via clasps. The arms, the sensor mounts, and the clasp connections can be switched and, therefore, adapt to any kind of sensor or automobile. The gear tray can be taken out as a whole and without removing the system from the vehicle roof.

The whole outer shell, including the arms and the sensor mounts, is made of aluminum with a transparent window in the front and back of the main unit. The system is waterproof and includes rubber gaskets at every joint that seal it against any water entry when the separate parts of the shell are fastened together with the corresponding screws. The transparent window in the front and back of the main unit is sealed using gaskets and secured by retaining clips on the top, side and the bottom. The rear window includes openings permitting the passage of cables coming in and out of the unit. The unit is further protected by water using cable glands positioned at the cable window interface. The two sides of the main unit can be customized to hold a company's name and logo as well as additional electronics. Also, additional cameras can be added to the side and rear panels. All exterior components and panels are designed to be aesthetically pleasing as well as minimize drag and reduce wind noise.

Each of the four arms is connected to the main body via four bolts and can be taken off and interchanged for longer/shorter versions to adjust to the width of different vehicles. The sensor mounts at the end of each arm are secured via bolts through the arm (universal connection) and possess a modular mount for the sensor that can be switched according to the kind of sensor being used. The sensor mount has two pins to align the sensor and ensure its correct orientation as well as maintain calibration upon removal and reinstallation. The bolt to secure the sensor in place is inserted through the middle of the sensor mount. Also, the sensor mounts facilitate adjustment of the sensors, so the sensors can be pitched +/−15 degrees from the nominal orientation. The two front arms are designed to hold LiDAR sensors. The rear arms hold two antennas (for GPS, LTE, Wi-Fi and/or Bluetooth). Each arm has at its end a modular adapter part that is removably attachable to the vehicle specific clasp used to secure the system to the vehicle. As a result, the system can adapt to different vehicle types and roof dimensions.

To get hand access to the gear tray inside, there is a removable access panel on each of the two sides of the main unit that open up to the interior. Alternatively, the top panels of the main unit can be taken off in two parts. With the top panels removed, the gear tray can then be taken out in one piece and with all the electronics attached to it. This way, the equipment elements inside can be easily switched, and the gear tray reinstalled without the sensors losing calibration.

The internal gear tray is reconfigurable and adjustable and can be taken out of the waterproof enclosure as a whole in order to replace parts more easily and with the advantage of keeping everything else securely in its place. Vibration and shock isolation are provided by rubber bushings under the mounting points of the gear tray. An air-cooling system through the rear legs and/or other parts of the enclosure (option fans may be added) is also included. The electrical connection to a back-up computing system in the trunk of the vehicle is made possible by a set of cables coming out of the rear window of the main unit and entering the vehicle interior via a cable pass-through which also contains the stock aerial.

The gear tray is also made out of bent sheet aluminum. It consists of a rectangular base sheet with bent up edges on the two longer sides. Two brackets, one at the front and one at the back, support a top strut that runs across the whole length of the gear tray. The top strut has three modular sensor mounts, one LiDAR mount in the middle (height can be adjusted +/−5 inches) and 2 extra mounts for additional sensors (antennas for Wi-Fi, GPS, Bluetooth or LTE, or extra cameras) in the front and back of it. On both sides of the base sheet in the front third part are CPU support brackets that hold the computer in place which goes below the strut. Additionally, towards the rear and along the centerline of the base sheet, there is an IMU/INS (inertial measurements/navigation unit/system) sensor mounted using three bolts to detect vehicle movement and orientation.

The front bracket supports the top strut and also holds a replaceable camera mount with space for three cameras. The cameras are each fixed to the mount via four bolts and the mount itself gets bolted onto the bracket with two bolts. The one-piece camera mount is changeable to allow customization for specific cameras or pitch changes for the cameras. The back bracket has a cut-out at the bottom to let cables through cable glands, as well as a shelf further up which serves as camera mount for one camera (replaceable and configurable as the one in front). Two side wing brackets help with the rear support of the top strut. The left wing has two clamps attached to it (inside and outside) to hold ethernet switches, USB hubs or power buses. Below the top strut is a middle bracket which serves as a mounting area for additional electronic equipment, just as all other free surfaces of the gear tray.

The system is designed in such a way that installation, removal, maintenance, and modification have minimal impact on other parts within the system. It is, therefore, assembled in parts and modules that are easily separable and accessible. All components of the unit withstand functional and durability testing on public roads.

BRIEF DESCRIPTION OF THE DRAWINGS

The present invention is described with reference to the following drawings, wherein like reference numbers denote substantially similar elements:

FIG. 9 is a table of example electronic components of the unit of FIG. 1;

DETAILED DESCRIPTION

The present invention overcomes the problems associated with the prior art, by providing a shockproof and weatherproof autonomous unit that can be universally mounted on the roof of various vehicles. In the following description, numerous specific details are set forth (e.g., materials, specific geometries, configurations, etc.) in order to provide a thorough understanding of the invention. Those skilled in the art will recognize, however, that the invention may be practiced apart from these specific details. In other instances, details of well-known manufacturing practices (e.g., sheet metal forming, gasket forming, etc.) and autonomous vehicle components (e.g., computer programming, drive wire details, etc.) have been omitted, so as not to unnecessarily obscure the present invention.

Figure 1:
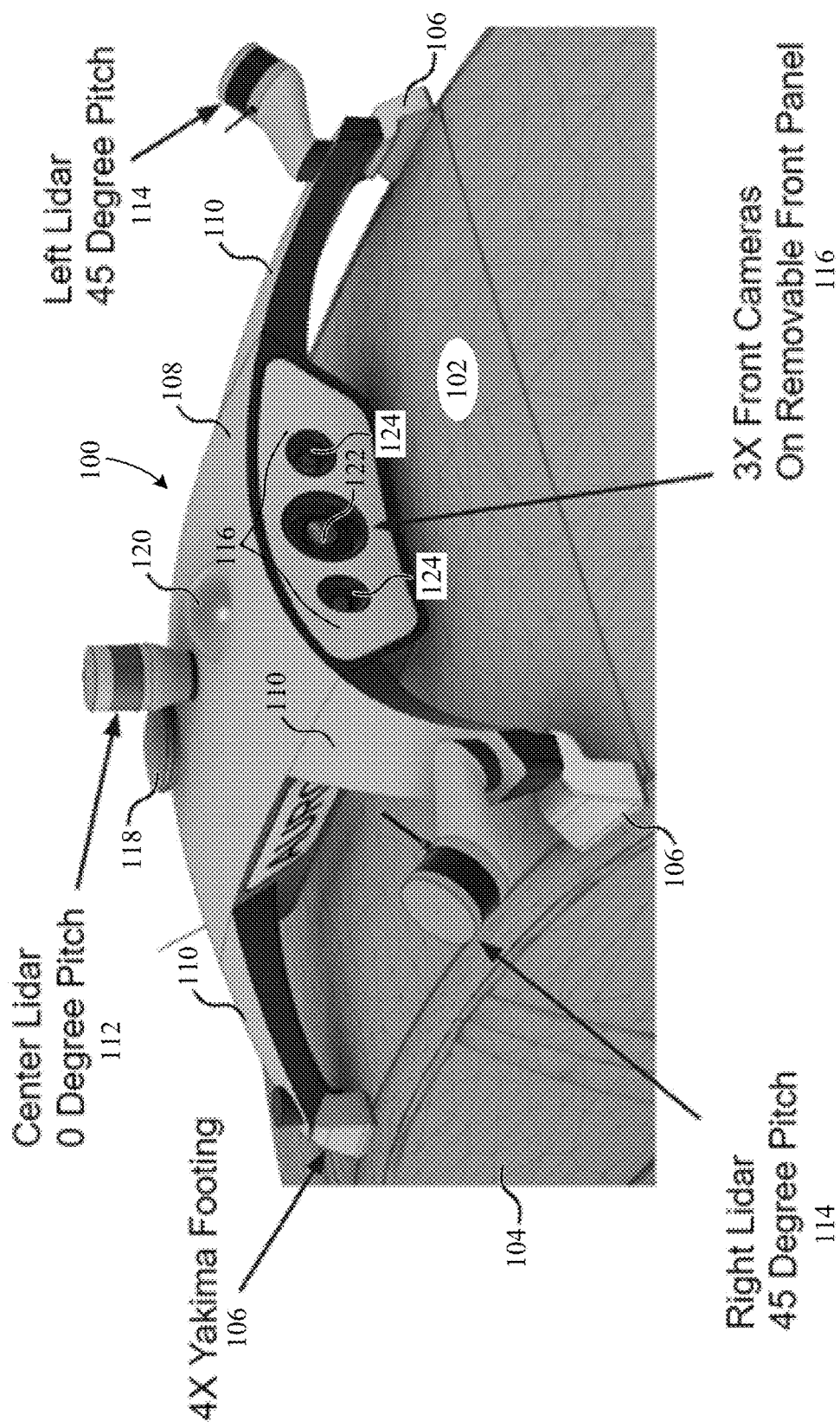
FIG. 1 is a front perspective view of an autonomous vehicle control unit mounted on the roof a hosting vehicle.

FIG. 1 shows a front perspective view of an autonomous vehicle control unit 100, according to a first example embodiment of the present invention. In the example embodiment, unit 100 is shown removably mounted on a rooftop 102 of a hosting vehicle 104 by a set of four footings 106 which, in this example, are Yakima footings.

Unit 100 is a universal system that can be removed from vehicle 104 and mounted on a variety of different models. In this example, vehicle 104 is originally a non-autonomous vehicle that is converted to an autonomous vehicle by unit 100 without permanently modifying vehicle 104. Indeed, unit 100 may be removed from vehicle 104 thereby converting it back to a non-autonomous vehicle. Unit 100 includes a plurality of sensors that observe the surrounding driving environment (e.g., presence of nearby moving and stationary vehicles, pedestrians, etc.), a plurality of receivers (e.g. antennas) that receive signals transmitted from remote sources (e.g., cell towers, other autonomous vehicle control units, GPS satellites, etc.), an onboard computer that generates vehicle control instructions (e.g., braking, accelerating, turning, etc.) responsive to data acquired by the sensors and receivers, and an interface that outputs the control instructions to the main computer of the host vehicle.

Unit 100 includes a fully weatherproof housing 108 supported by four legs 110 extending downward therefrom. Housing 108 provides structural support and protection to various electrical components to which it is coupled, including, but not limited to, a center light detection and ranging (LiDAR) sensor 112, two side LiDAR sensors 114, a set of front cameras 116, a first antenna assembly 118, and a second antenna assembly 120. Center LiDAR sensor 112 is a Velodyne LiDAR 32C unit having a 5 inch height adjustability. Each of LiDAR sensors 114 is a Velodyne LiDAR 16 unit mounted on a respective one of front legs 110 at a pitch of 45 degrees and with a pitch adjustability of +/−15 degrees. Cameras 116 include one wide angle camera 122, and two narrow angle cameras 124. First antenna assembly 118 is a Swiftnav GPS antenna assembly having a 150 degree sky line of sight. Second antenna assembly 120 is a 5-in-1 antenna including two cellular/GSM antennas, two wifi antennas, and a GPS antenna.

Figure 2:
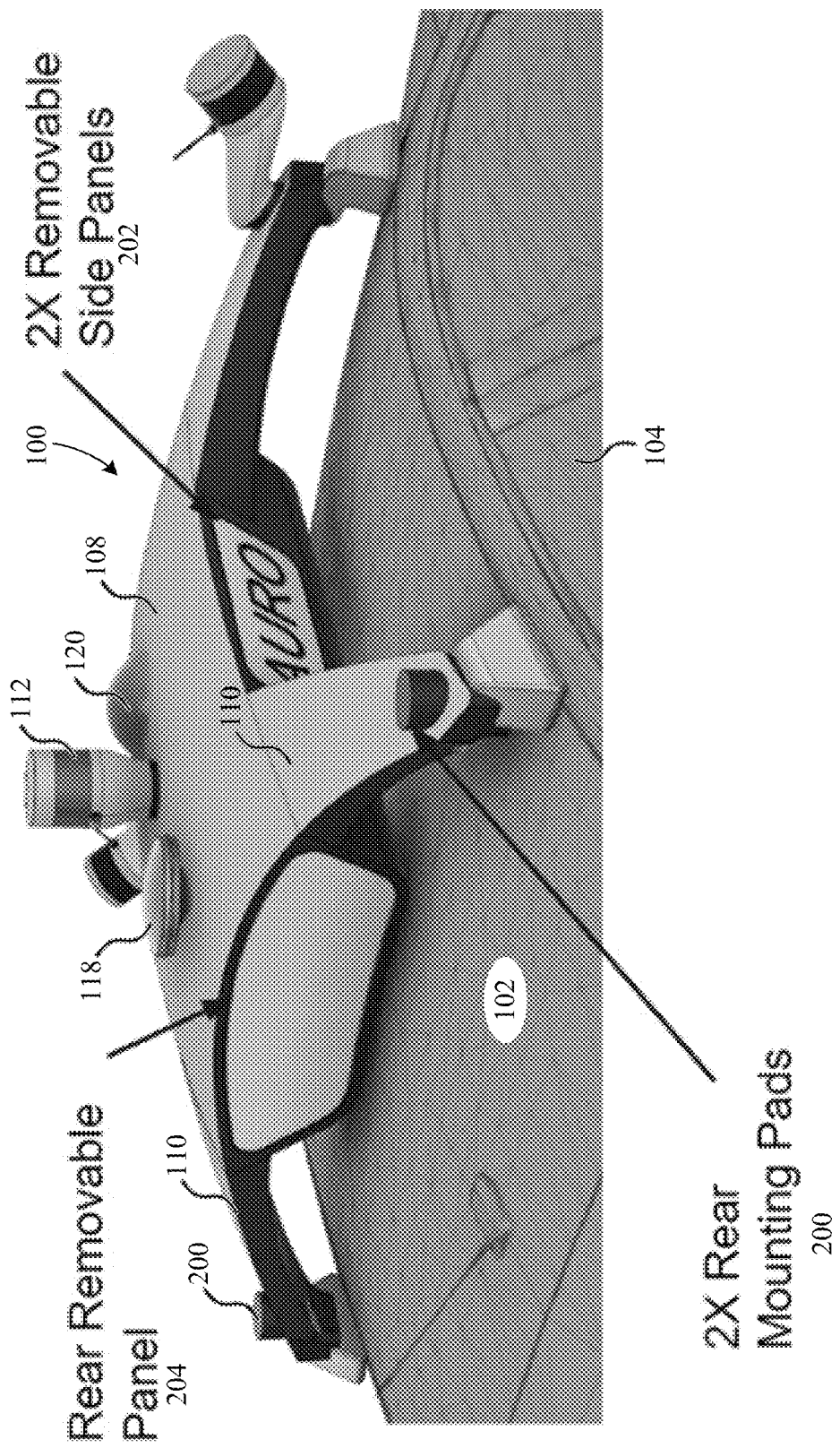
FIG. 2 is rear perspective view of the unit of FIG. 1.

FIG. 2 shows a rear perspective view of unit 100 mounted on rooftop 102 of vehicle 104. As shown, each of the two rear legs 110 includes a respective mounting pad 200 for optionally mounting additional modular sensors such as, for example, LiDAR sensors, radar sensors, cameras, antennas, etc. Housing 108 further includes two removable side panels 202 and a removable rear panel 204 that provide access into the internal region of unit 100 where additional electrical and mechanical components are mounted.

Figure 3:
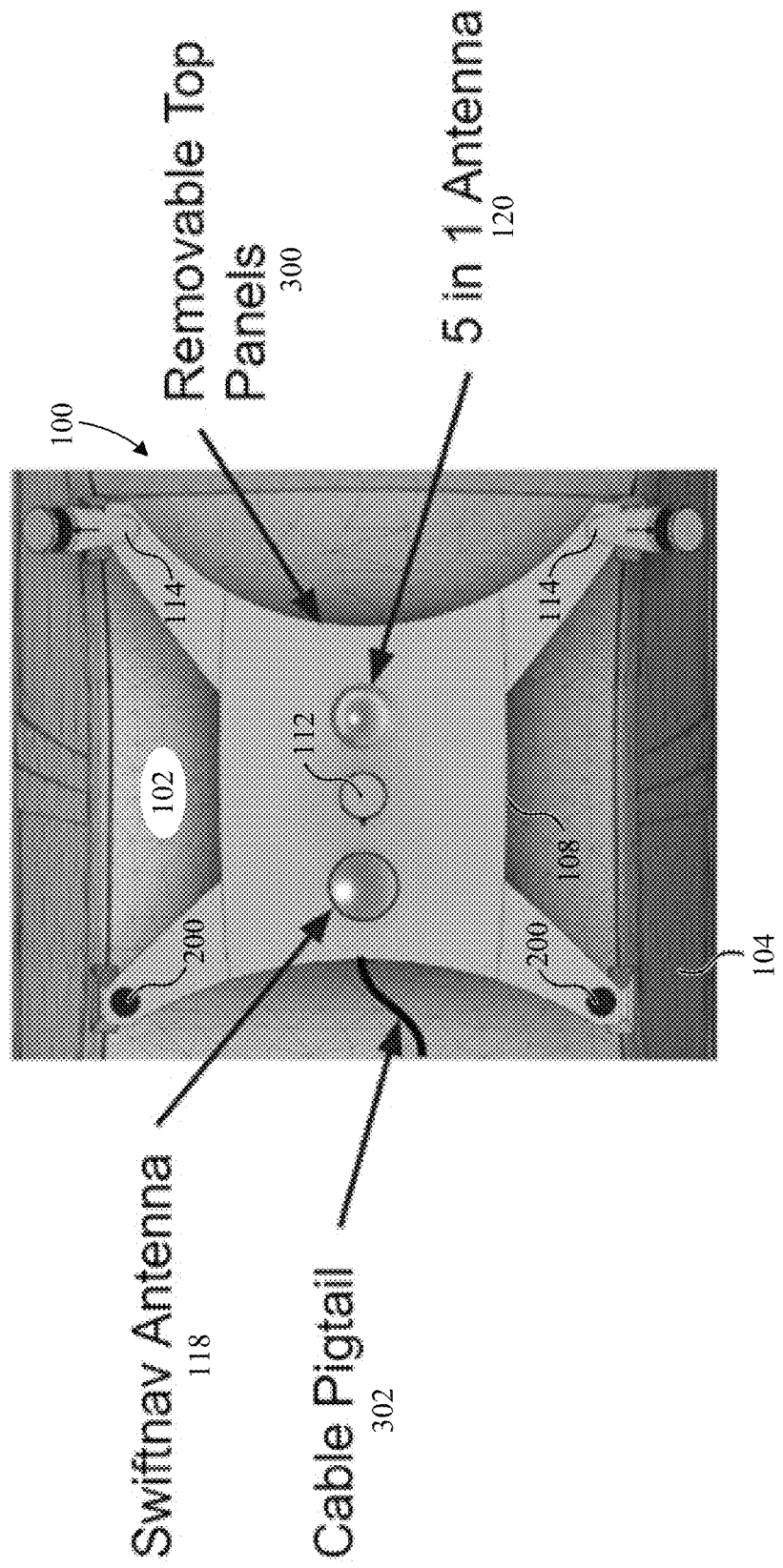
FIG. 3 is a top view of the unit of FIG. 1.

FIG. 3 shows a top view of unit 100 mounted on rooftop 102 of vehicle 104. As shown, housing 108 further includes removable top panels 300 that provide access into the interior of unit 100. Unit 100 further includes a cable pigtail 302 that facilitates the electrical connection between unit 100 and a backup computing system in the trunk of vehicle 104 and/or a drive wire of vehicle 104.

Figure 4:
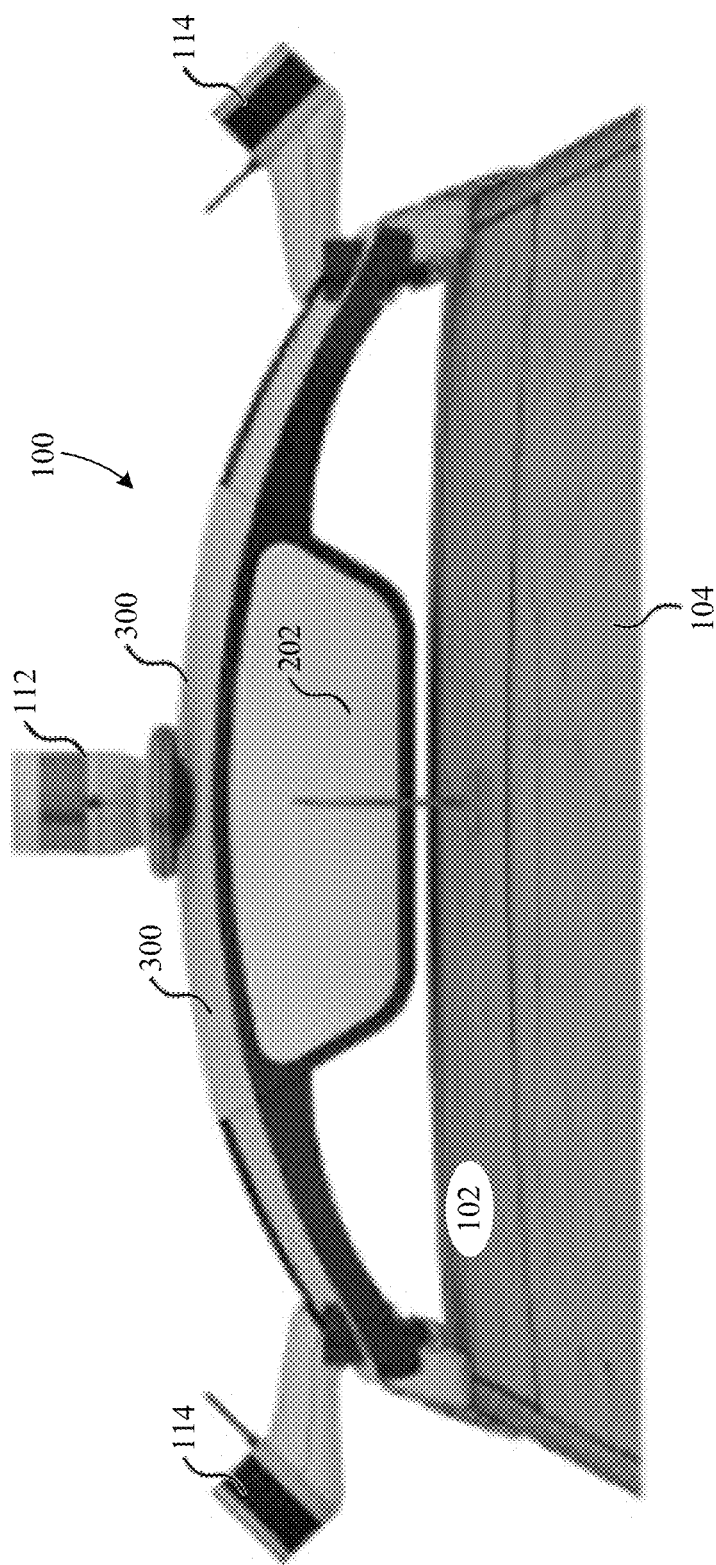
FIG. 4 is a rear view of the unit of FIG. 1.

FIG. 4 shows a rear view of unit 100 mounted on rooftop 102 of hosting vehicle 104.

Figure 5:
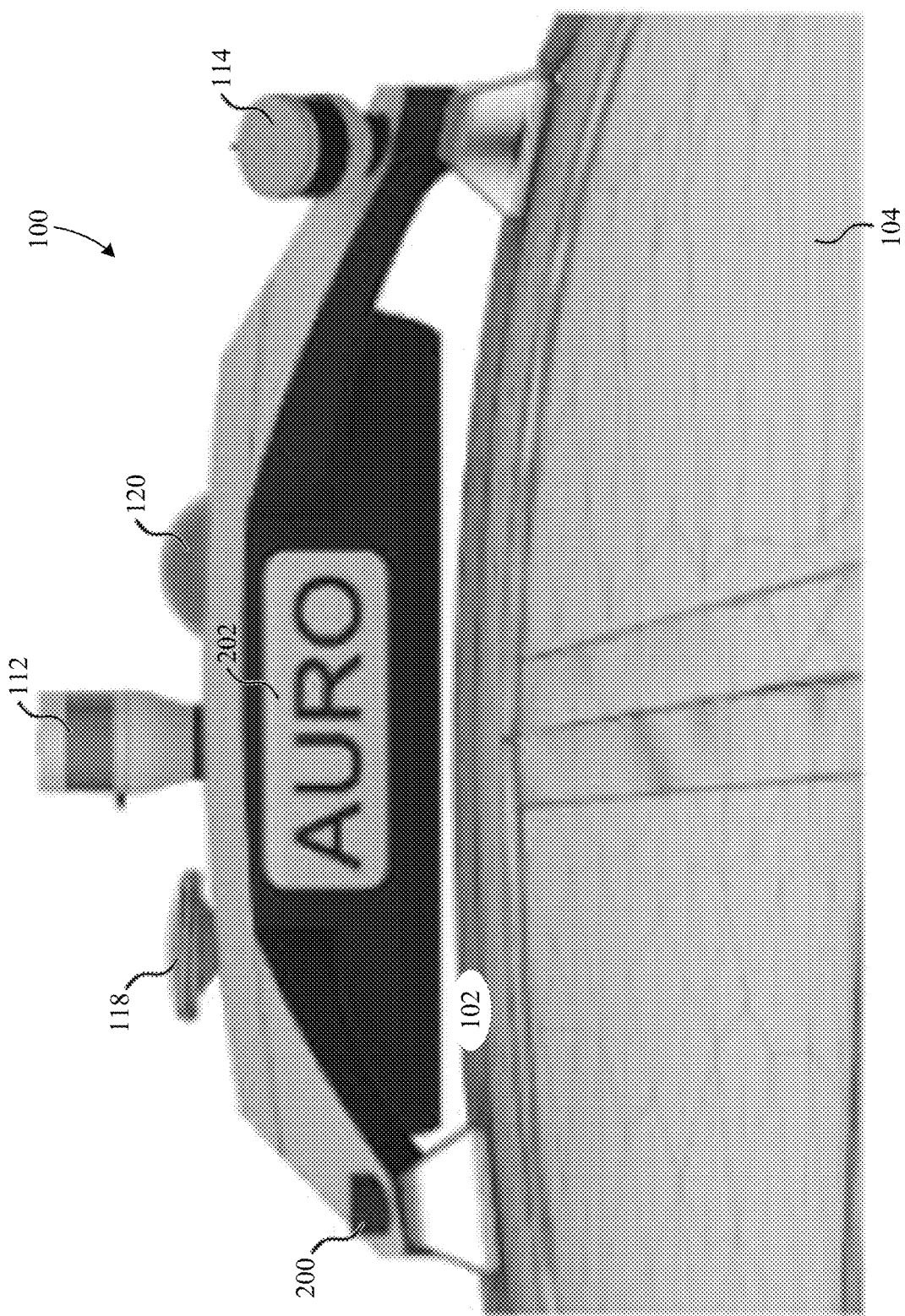
FIG. 5 is a side view of the unit of FIG. 1.

FIG. 5 shows a side view of unit 100 mounted on rooftop 102 of hosting vehicle 104.

Figure 6:
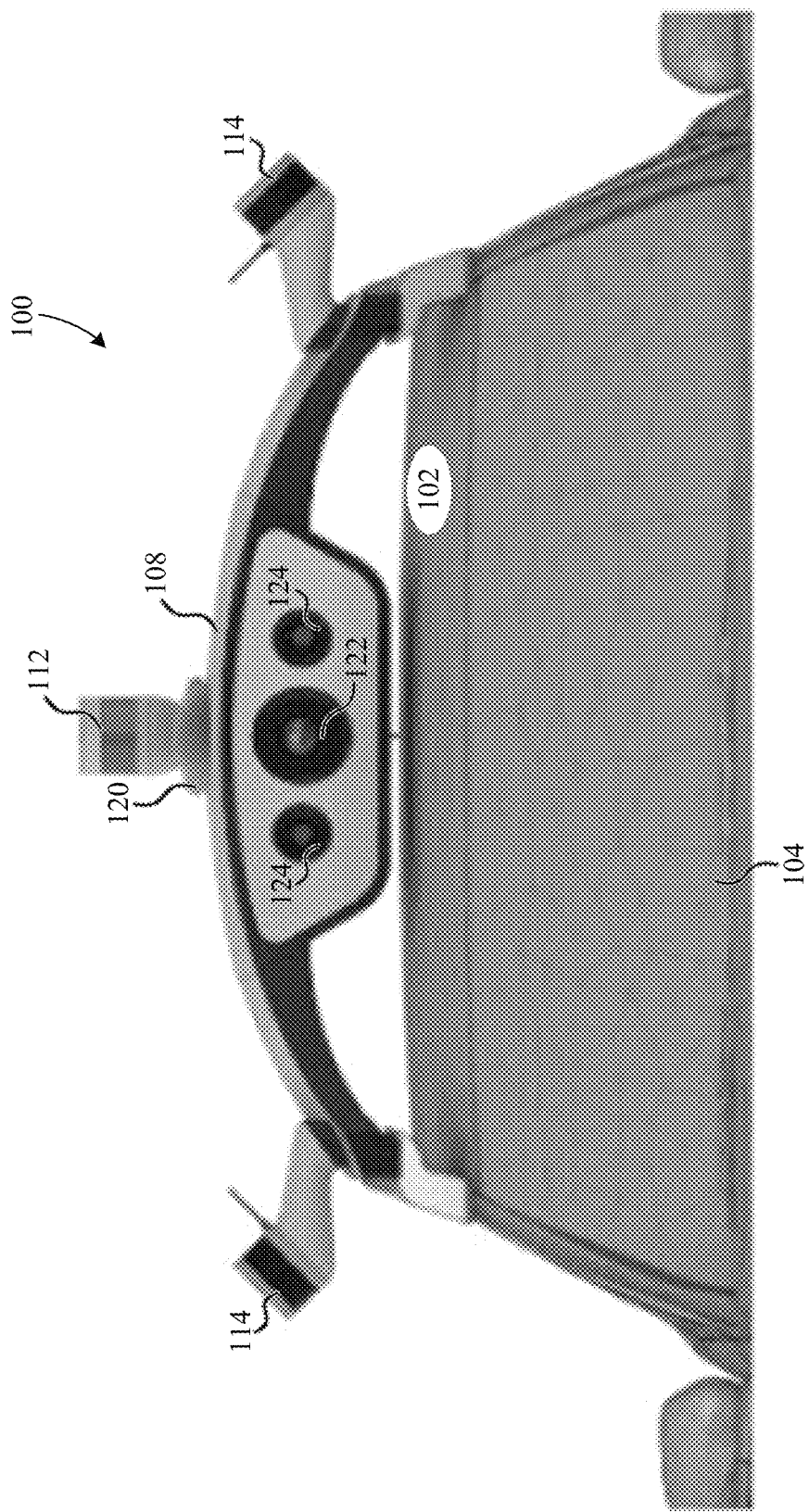
FIG. 6 is a front view of the unit of FIG. 1.

FIG. 6 shows a front view of unit 100 mounted on rooftop 102 of hosting vehicle 104.

Figure 7:
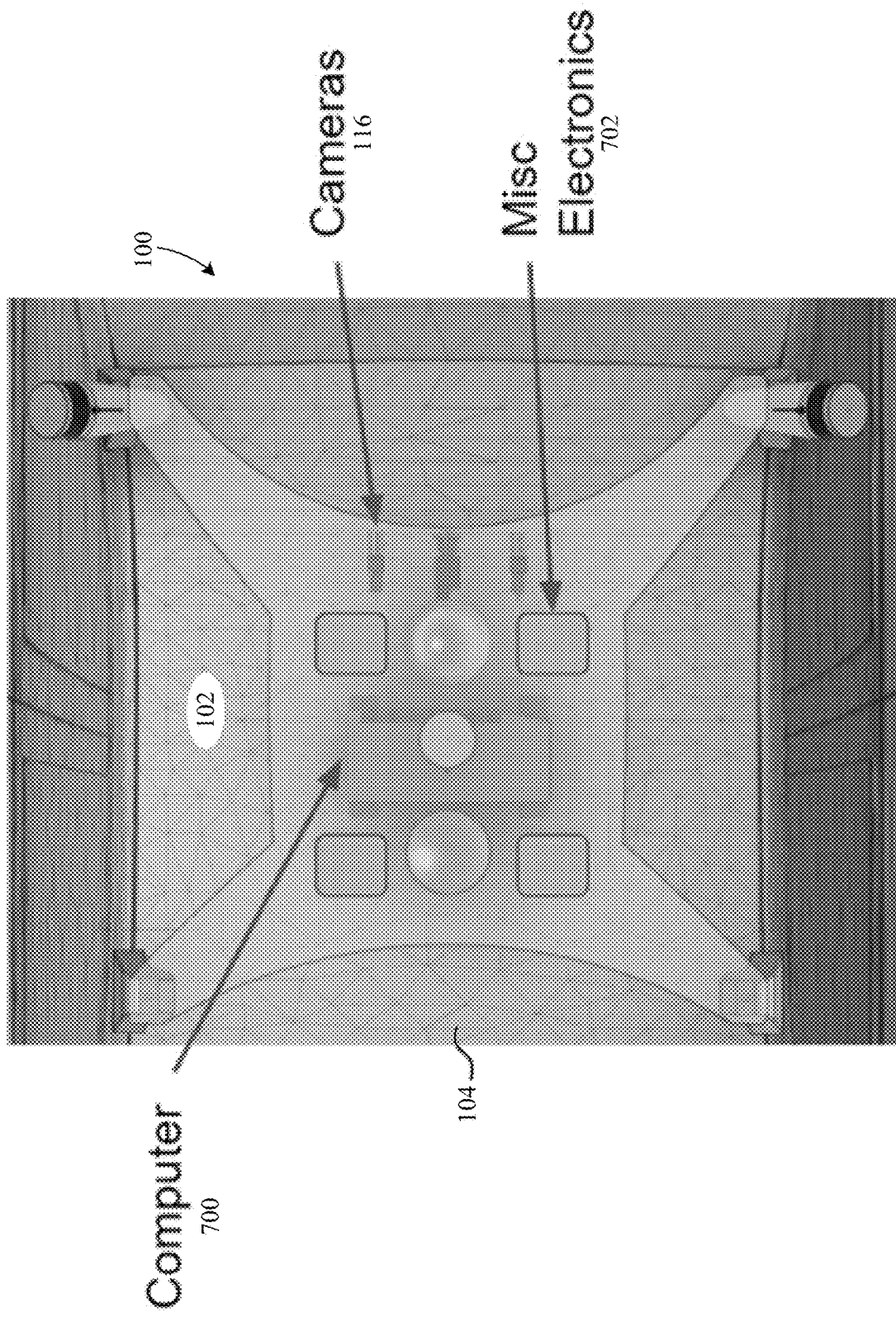
FIG. 7 is a top view of the unit of FIG. 1.

FIG. 7 is a top view of unit 100 showing internal components thereof in a "phantom" view. Unit 100 further includes a computer 700 and miscellaneous electronics 702. Computer 700 is electrically connected to control and communicate with electronics 702 and the various other electrical components of unit 100. Responsive to the input from the various sensors and commands received from local and/or remote interface devices, computer 700 provides control signals to vehicle 104, via cable pigtail 302 (FIG. 3) and the "drive wire" (not shown) of vehicle 104.

Figure 8:
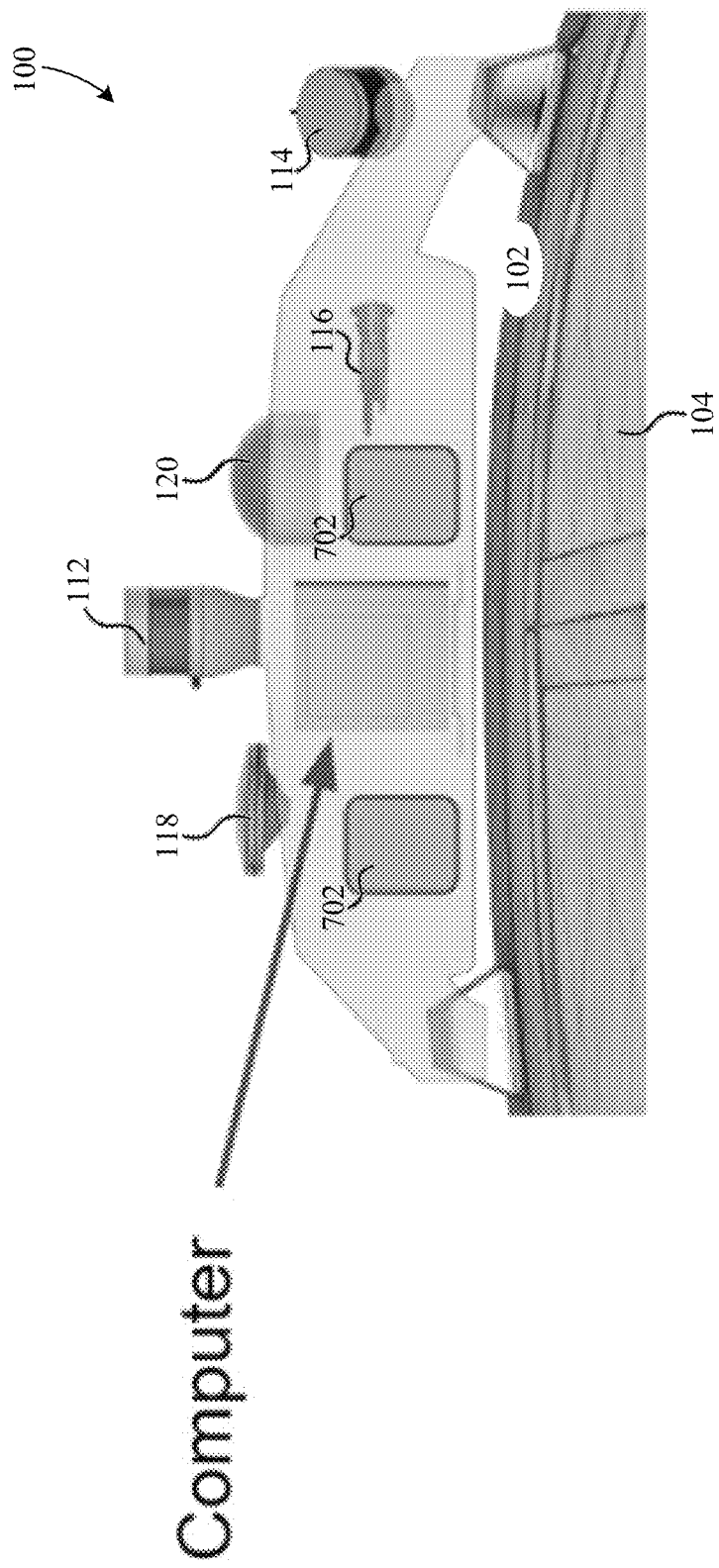
FIG. 8 is a side view of the unit of FIG. 1.

FIG. 8 is a side view of unit 100 showing internal components thereof in "phantom' view.

FIG. 9 shows a table-A including various electrical components of unit 100.

Figure 10:
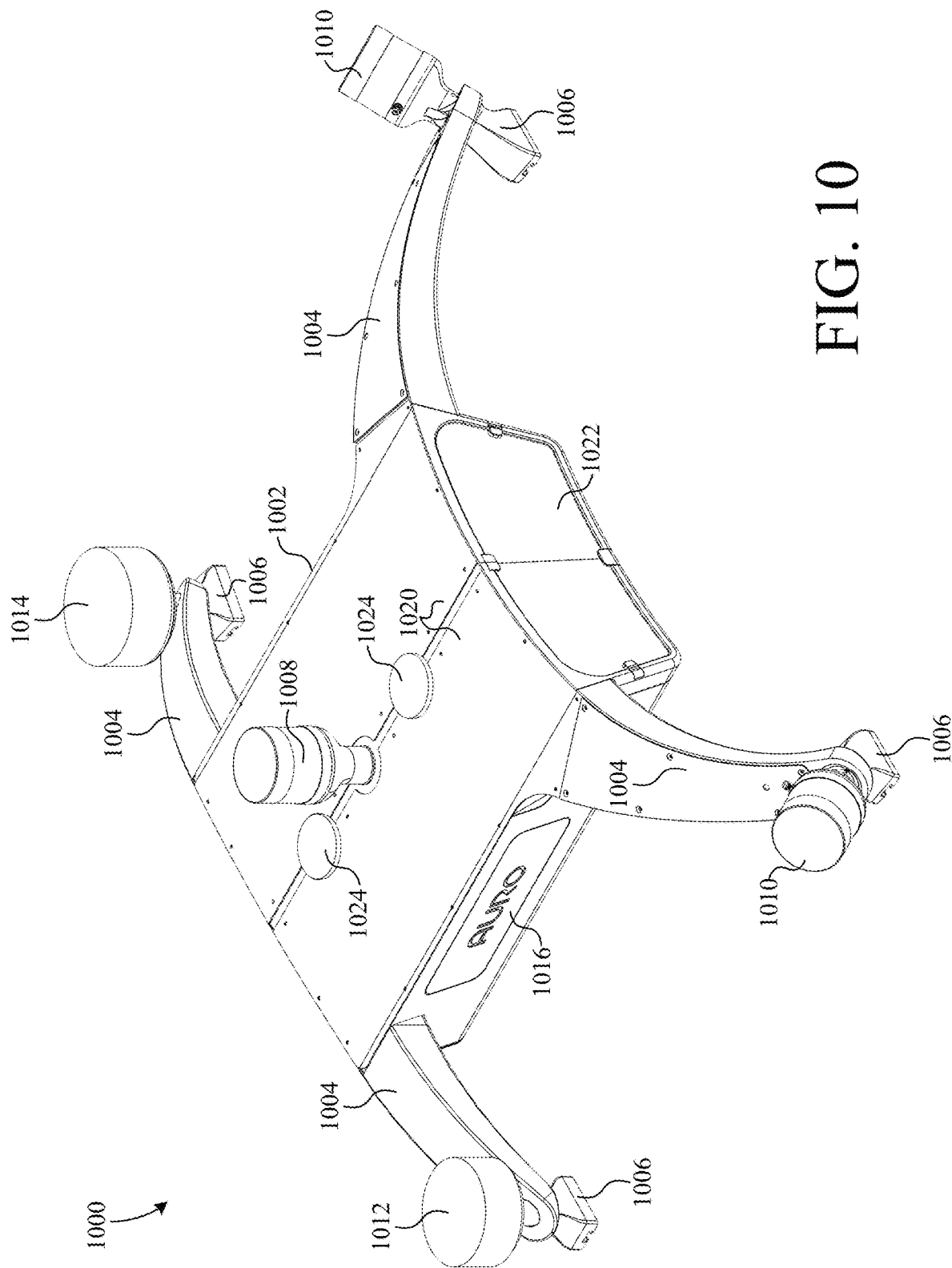
FIG. 10 is a front perspective view of another example autonomous vehicle control unit.

FIG. 10 shows a front perspective view of another example modular autonomous vehicle control unit 1000. Unit 1000 is configured to be universally and removably mounted on the rooftops of a wide variety of vehicle models.

Figure 16:
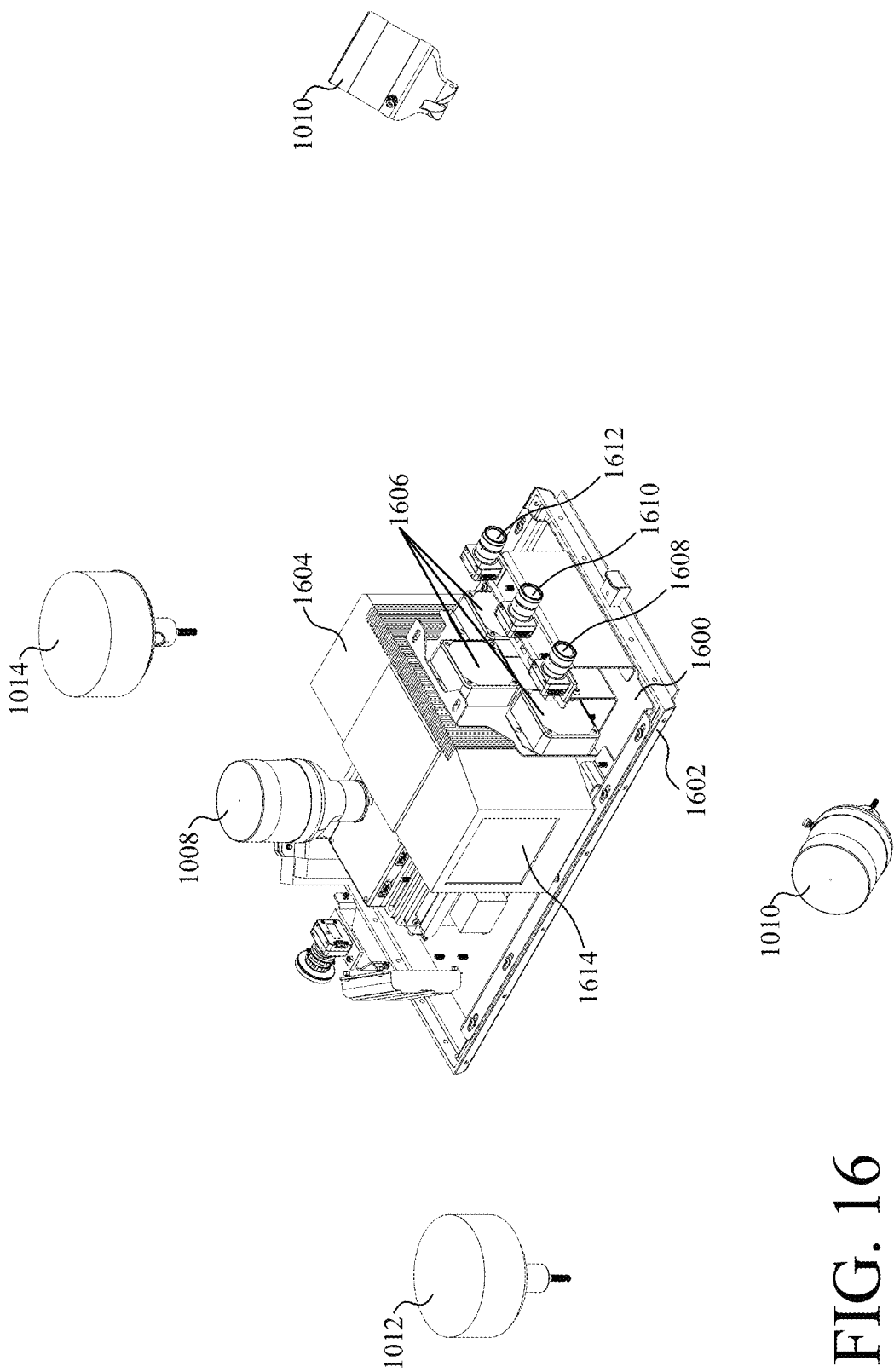
FIG. 16 is a front perspective view of some electrical components of the unit of FIG. 10.

Unit 1000 includes a housing 1002, four legs 1004, four feet 1006, a center LiDAR 1008, two front LiDARs 1010, a first antenna assembly 1012, a second antenna assembly 1014, and various internal electrical components (visible in FIG. 16). Housing 1002 protects the internal components of unit 1000 from elements such as moisture and debris. Housing 1002 is made up of a plurality of removable panels including two side panels 1016, a rear panel 1018 (visible in FIG. 11), two top panels 1020, and a front window 1022. In this example, front window 1022 permits the passage of light but is impermeable to moisture, so as to protect an underlying camera assembly without impeding its functionality. Legs 1004 extend from housing 1002 to support and mount unit 1000 over the rooftop of an automobile. Each of feet 1006 is removably mounted on the bottom of a respective one of legs 1004, to facilitate the mounting of unit 1000 to the rooftop. In this example, feet 1006 are manufactured by Yakima. Center LiDAR 1008 is a Velodyne 32C unit and both of front LiDARs 1010 are Velodyne LiDAR 16 units. First antenna assembly 1012 is a SwiftNav unit and second antenna assembly 1014 is a 5-in-1 antenna including two cellular/GSM antennas, two wifi antennas, and a GPS antenna. Unit 1000 further includes a set of hole-plugs 1024 that can be removed to access underlying universal electrical and mechanical component receivers, which are configured to accept modular components including, but not limited to, LiDAR units, cameras, radars, lights, etc.

Figure 11:
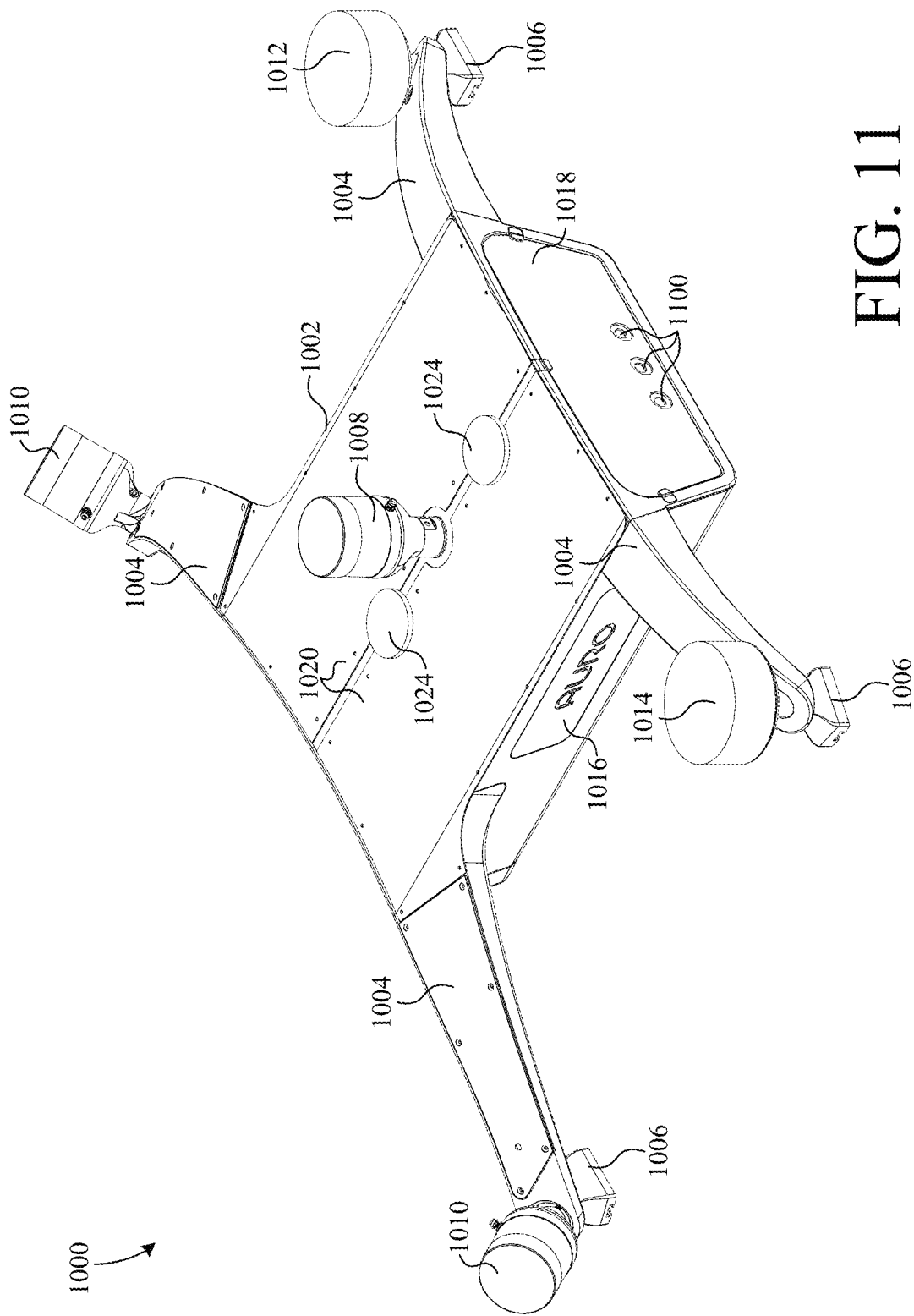
FIG. 11 is a rear perspective view of the unit of FIG. 10.

FIG. 11 shows a rear perspective view of unit 1000. As shown, panel 1018 includes a plurality of through-holes 1100 that permit the passage of cables through housing 1002. The cables (not shown) facilitate the electrical connection between internal components of unit 1000 and a drive/computing system of a host vehicle.

Figure 12:
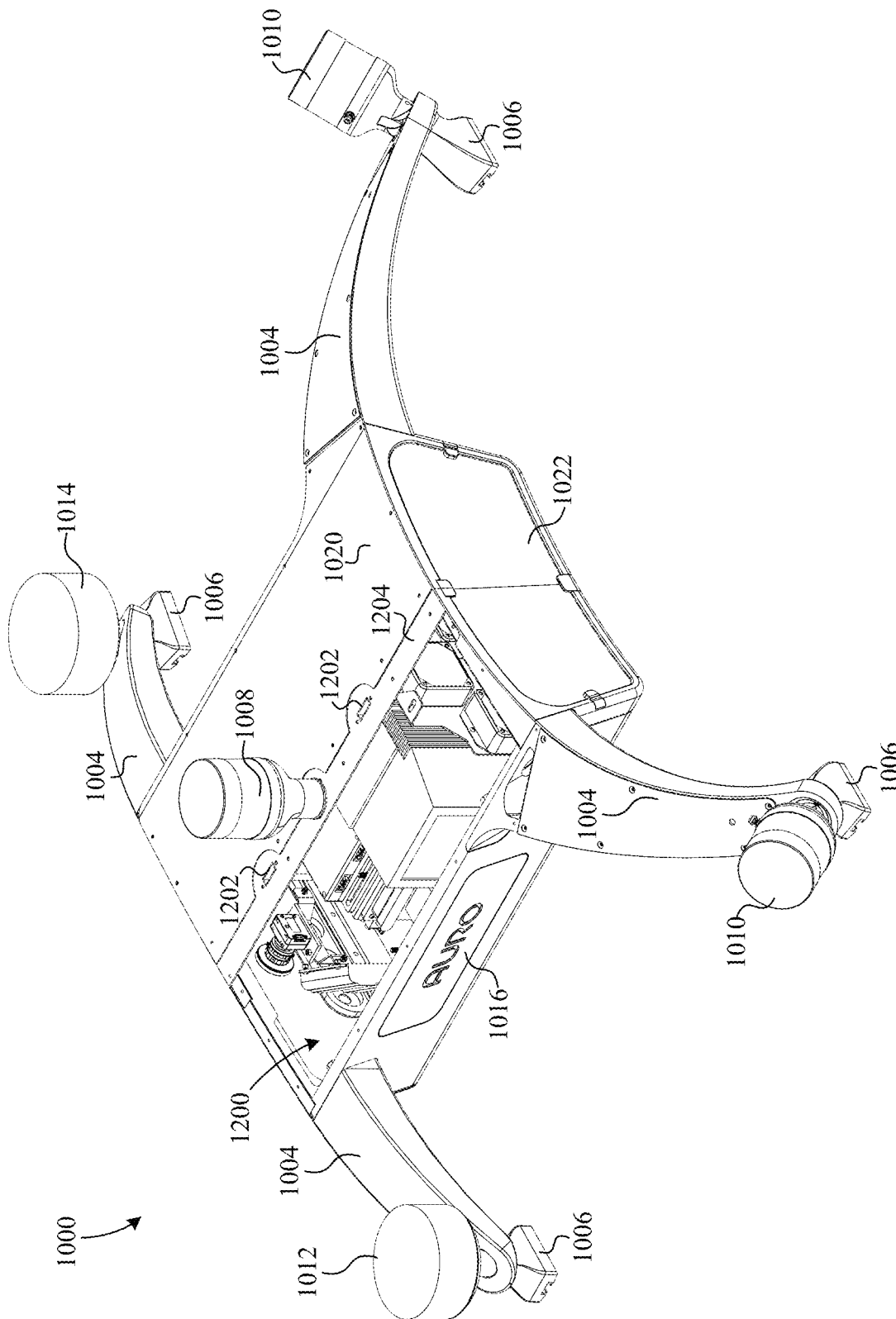
FIG. 12 is a front perspective view of the unit of FIG. 10 with a top panel removed.

FIG. 12 shows a front perspective view of unit 1000 with one of top panels 1020 removed to access the interior space 1200 of unit 1000, and plugs 1024 removed to access modular electrical/mechanical interfaces 1202. As shown, panels 1020, interfaces 1202, and LiDAR 1008 are supported on a central strut 1204.

Figure 13:
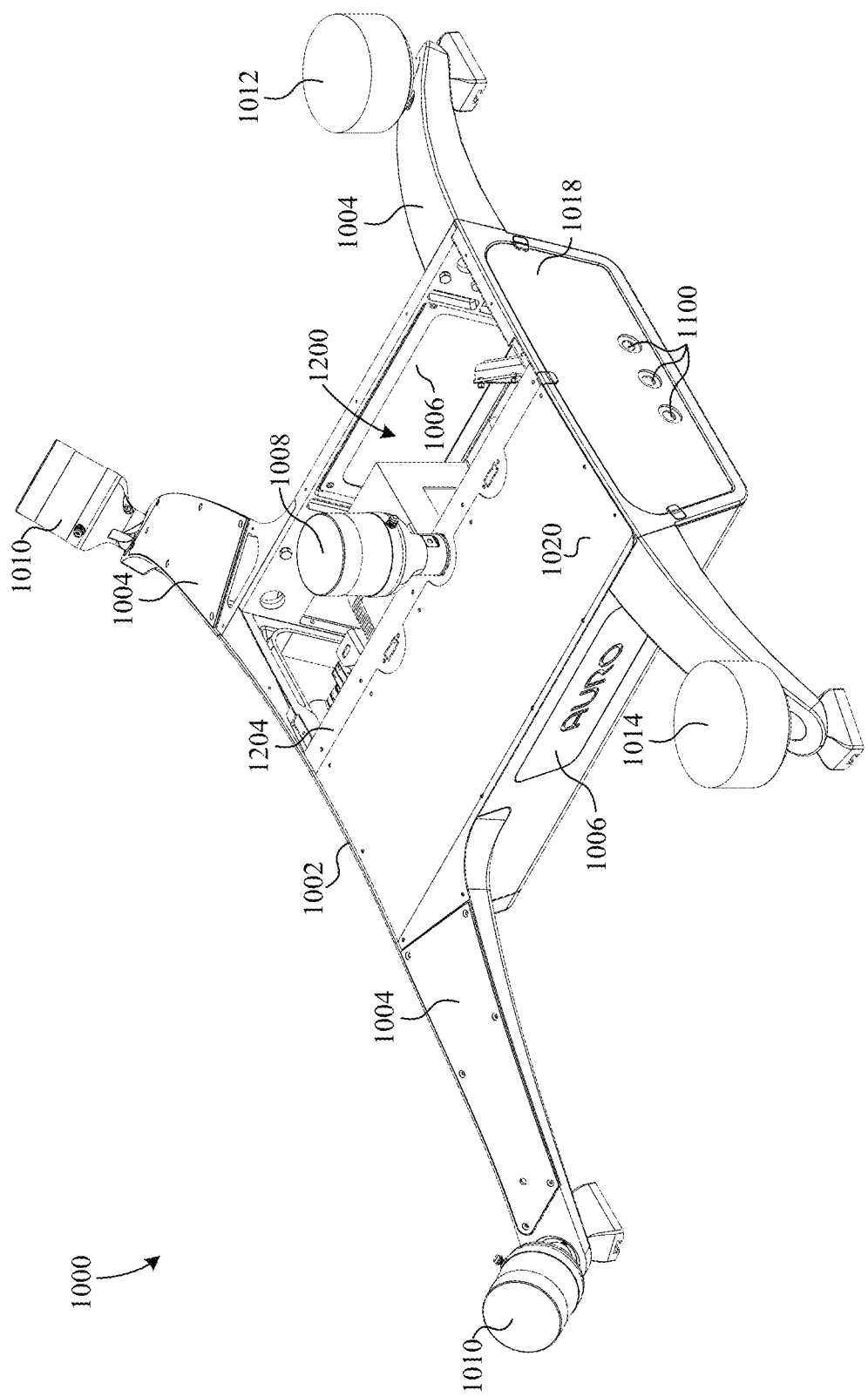
FIG. 13 is a rear perspective view of the unit of FIG. 10 with a top panel removed.

FIG. 13 shows a rear perspective view of unit 1000 with one of top panels 1020 removed to access the interior space 1200 of unit 1000.

Figure 14:
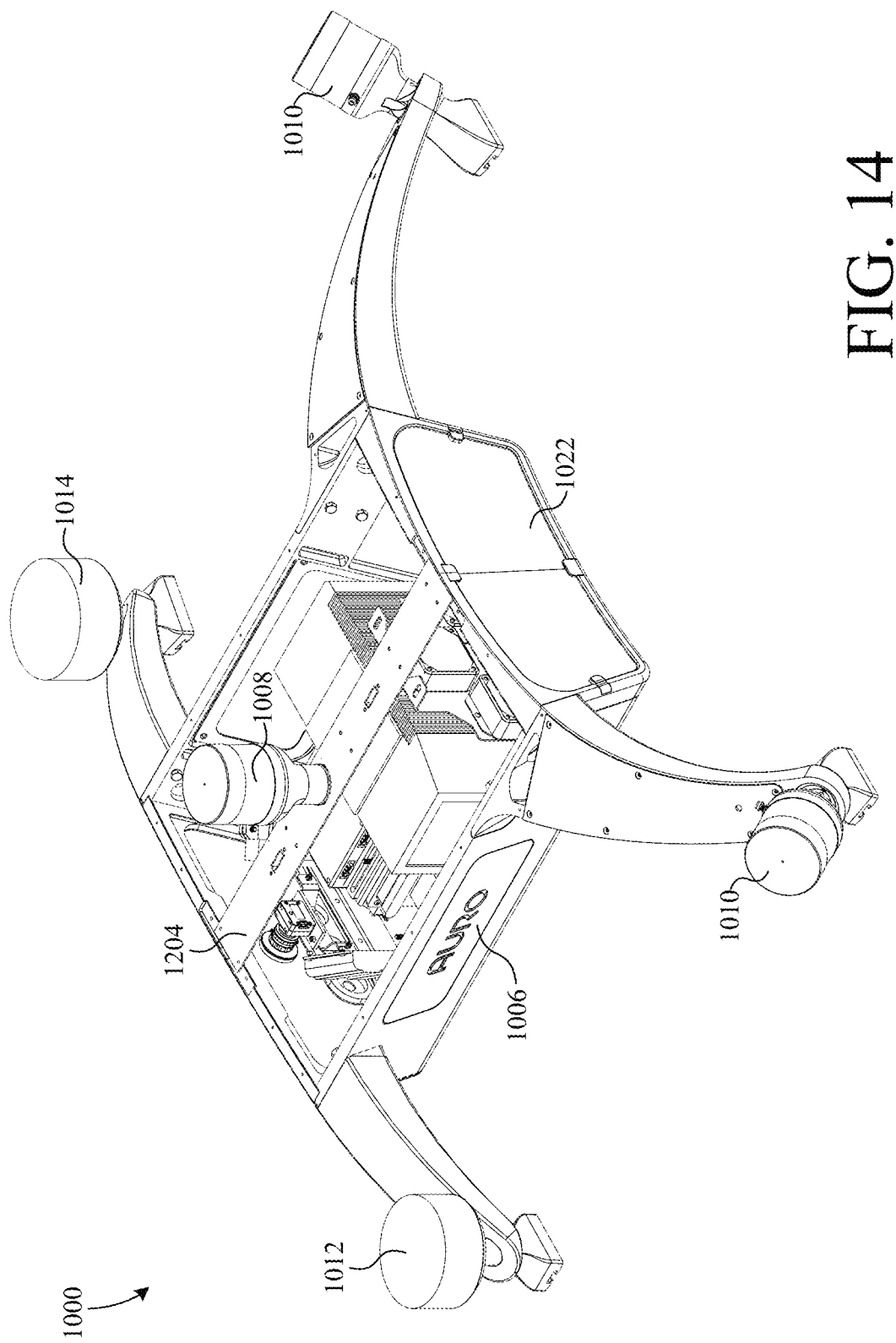
FIG. 14 is a front perspective view of the unit of FIG. 10 with both top panels removed.

FIG. 14 shows a front perspective view of unit 1000 with both of top panels 1020 removed.

Figure 15:
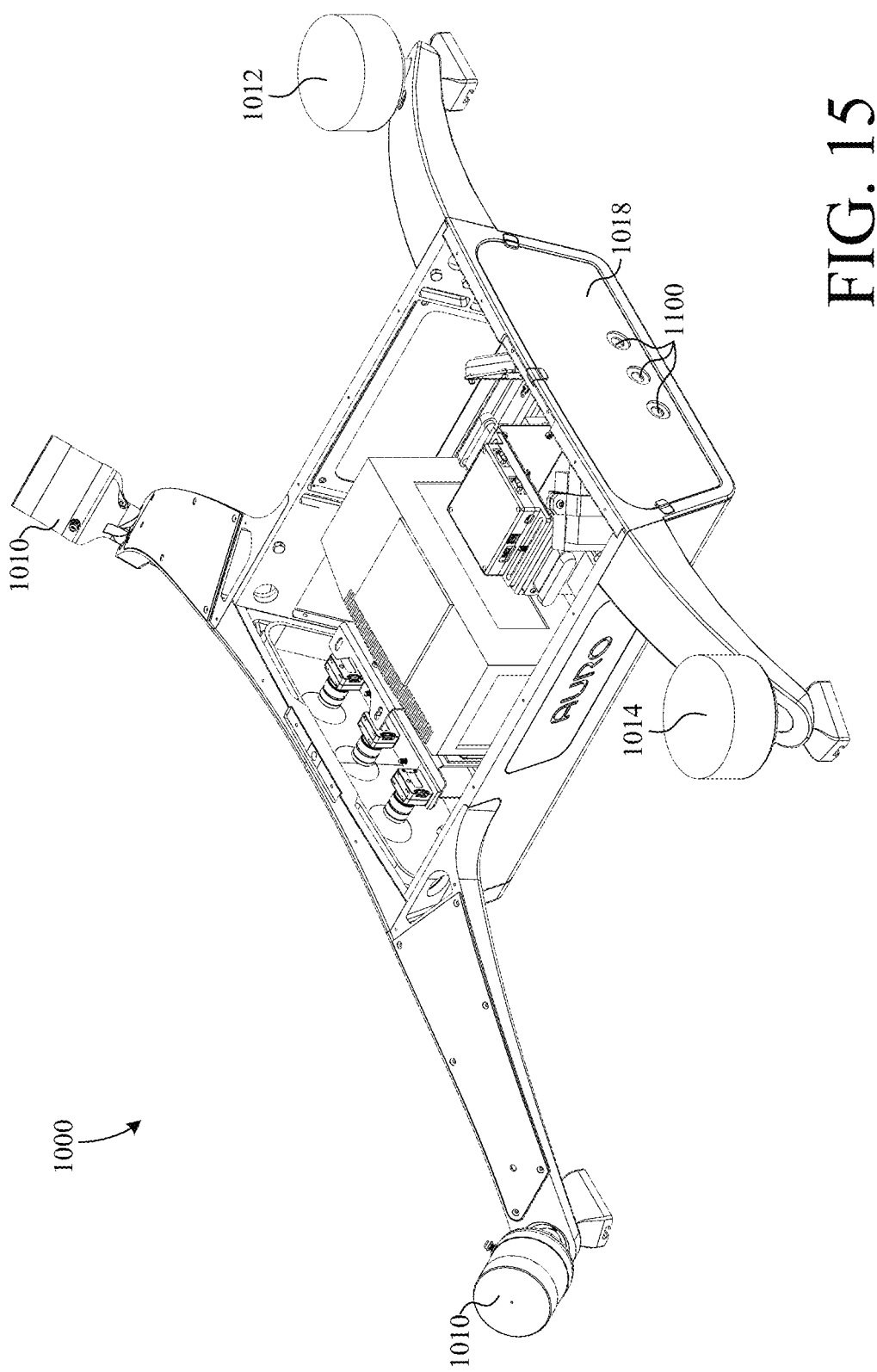
FIG. 15 is a rear perspective view of the unit of FIG. 10 with both top panels and center strut removed.

FIG. 15 shows a rear perspective view of unit 1000 with both of top panels 1020, strut 1204, and LiDAR 1008 removed.

FIG. 16 shows a front perspective view of the various electrical components of unit 1000. Many of the various electrical components of unit 1000 are mounted on a tray 1600, which is mounted on a chassis 1602. Tray 1600 is screwed to chassis 1602 with a plurality of resilient shock absorbing washers disposed therebetween. Tray 1600 and the various electrical components mounted thereon are, together, removable from unit 1000 by unscrewing tray 1600 from chassis 1602 and then lifting tray 1600 out of unit 1000.

The various electrical/electronic components include, but are not limited to, a computer 1604, three electrical units 1606, a first camera 1608, a second camera 1610, and a third camera 1612. Computer 1604 is electrically connected to the various electrical systems of unit 1000 through an interface panel 1614 adapted to receive connectors from various sensor systems. Each of the three electrical units 1606 includes the complementary electronics of a respective one of the three LiDARs 1008 (top, center), 1010 (driver side), and 1010 (passenger side). Camera 1608 is a narrow angle camera, camera 1610 is a wide angle camera, and camera 1612 is a low light camera (e.g., near infra red).

Figure 17:
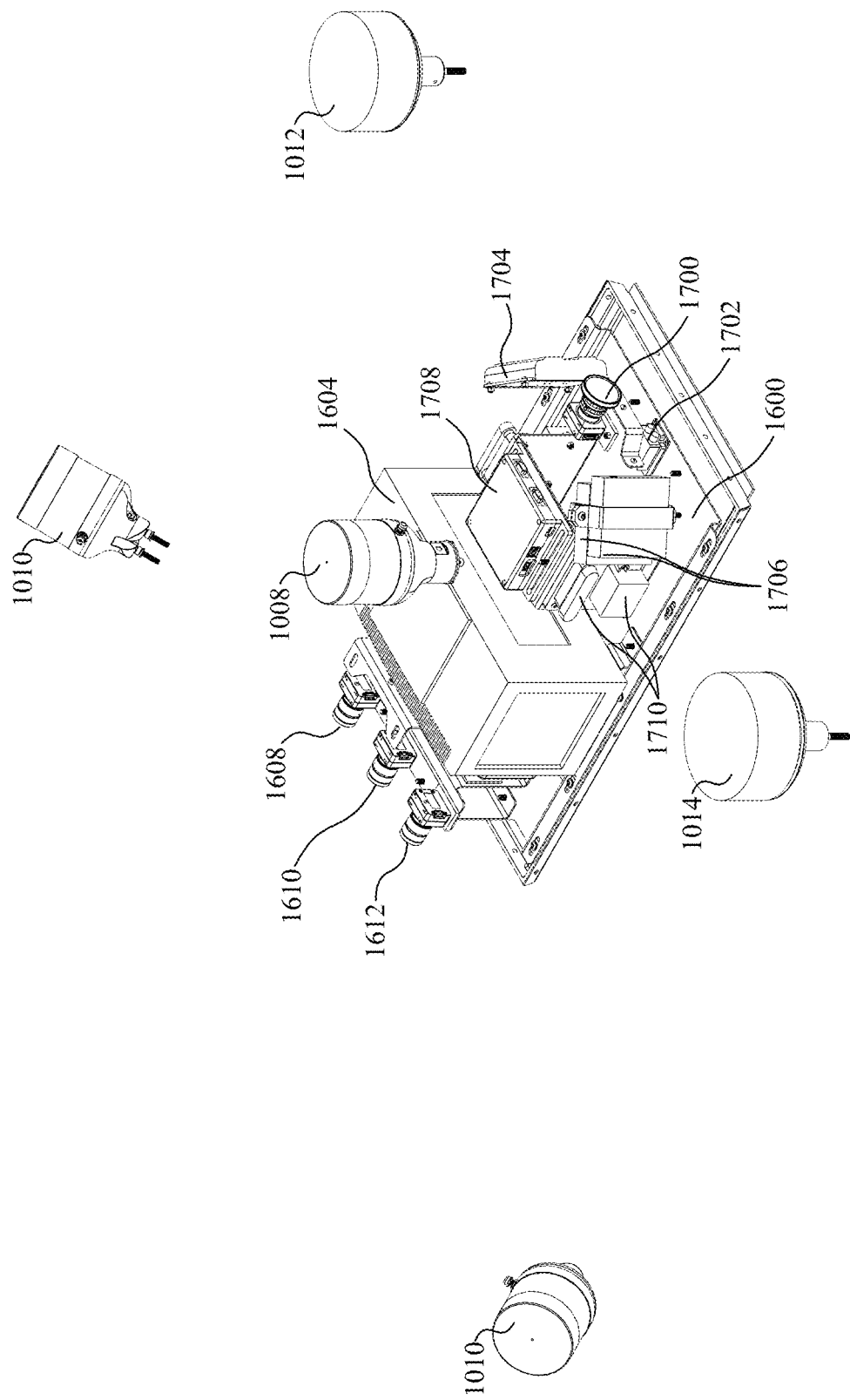
FIG. 17 is a rear perspective view of some electrical components of the unit of FIG. 10.

FIG. 17 shows a rear perspective view of the various electrical components of unit 1000 mounted on tray 1600, including additional components not completely visible in FIG. 16. The electrical components further include a rear camera 1700, an inertial navigation system (INS) 1702, a CraddlePoint LTE unit 1704, a set of Netgear Ethernet switches 1706, a SwiftNav electronics unit 1708, and a DC power bus 1710. Camera 1700 is a rear facing wide angle camera. INS 1702 is mounted at a centerline of unit 1000 to measure pitch, tilt, and yaw. CraddlePoint LTE unit 1704 is an internet modem. SwiftNav electronics unit 1708 houses various electronic components for antenna assembly 1012. DC power bus 1710 provides DC power to the various components of unit 1000.

Figure 18:
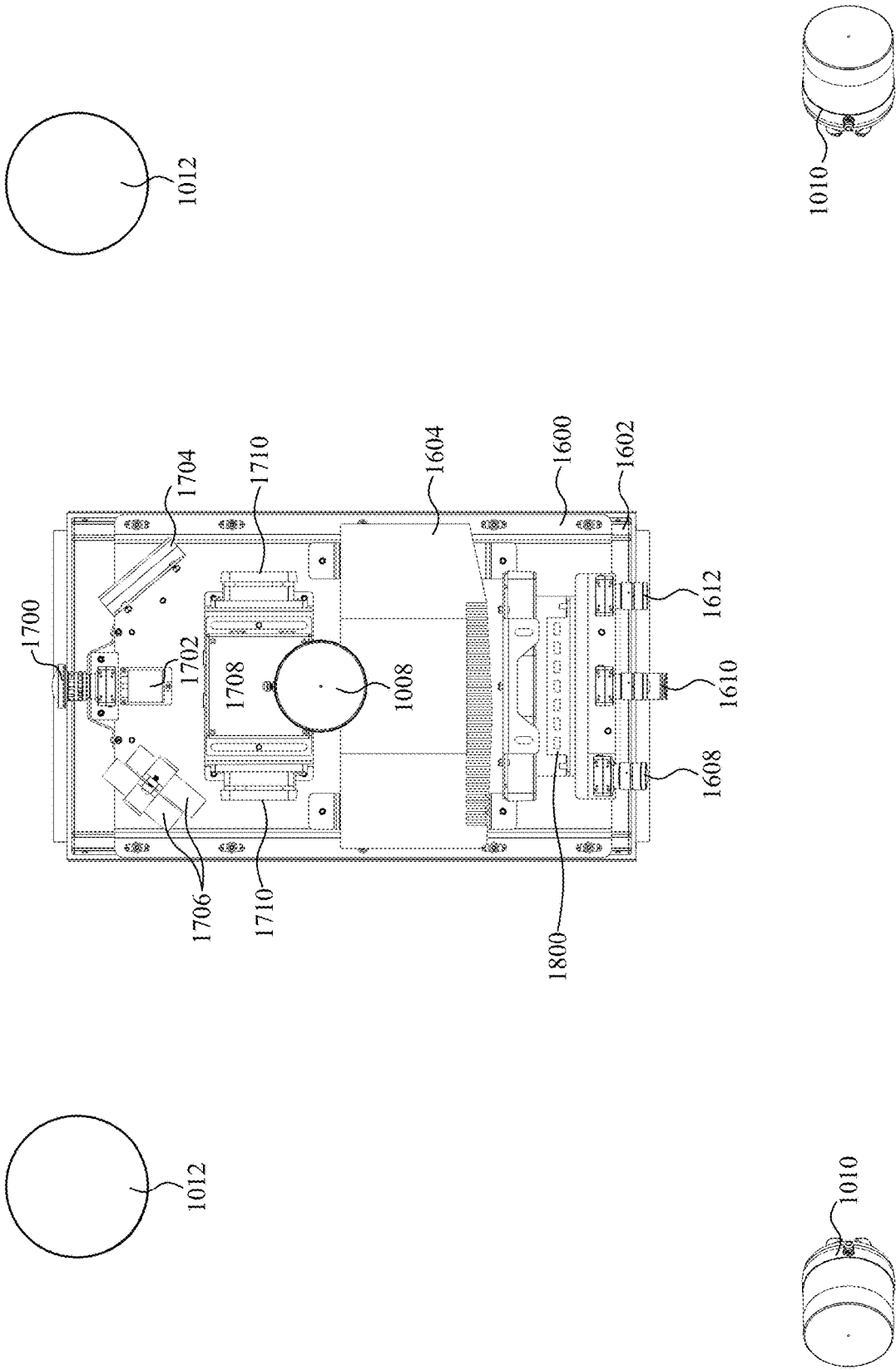
FIG. 18 is a top view of the electrical components of the unit of FIG. 10.

FIG. 18 shows a top view of the various electrical components of unit 1000. As shown, the various electronic components of unit 1000 further include a USB hub 1800. The connecting cables of unit 1000 are omitted from the drawings, so as not to unnecessarily obstruct the views of the other components.

Figure 19:
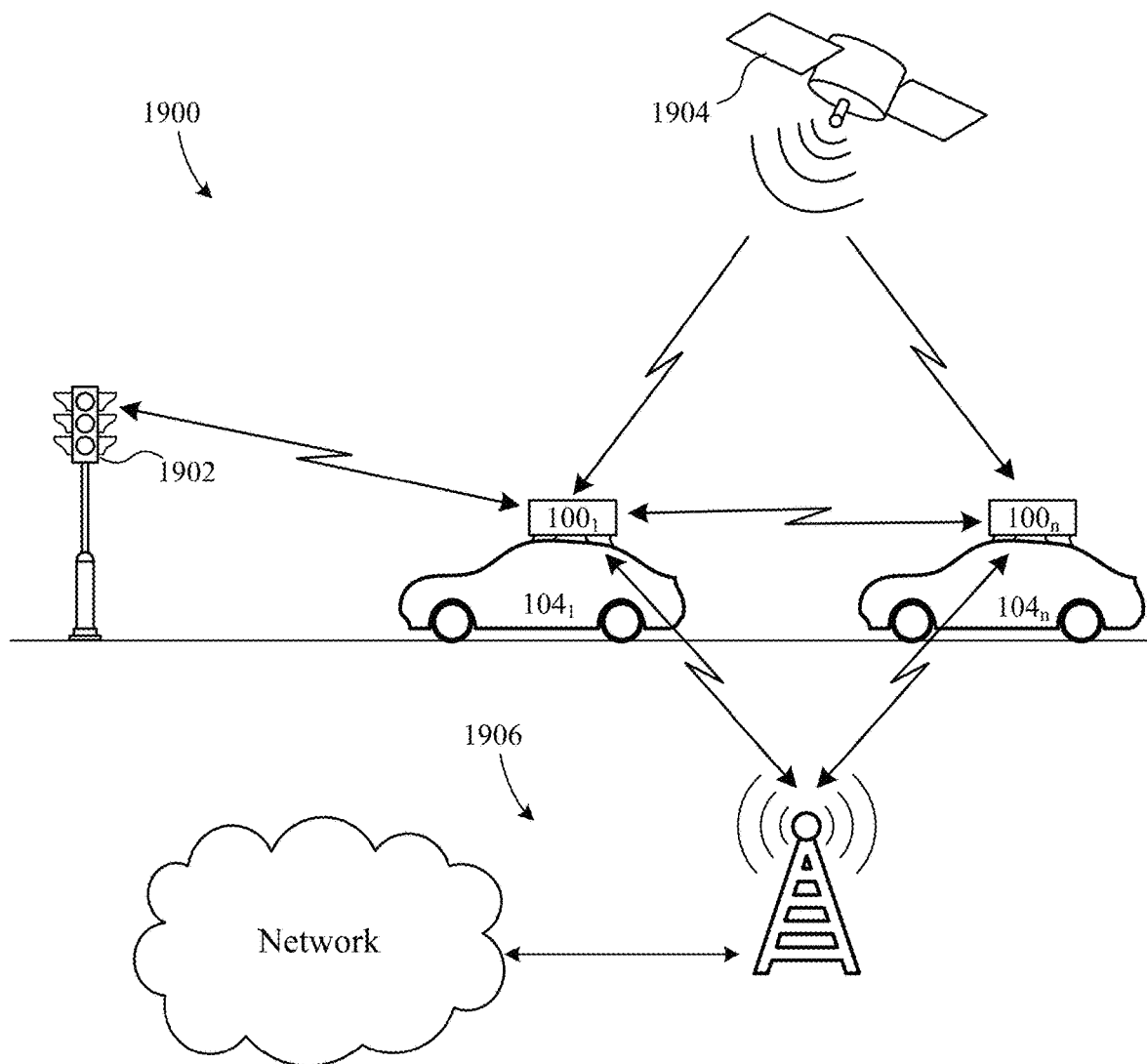
FIG. 19 is a block diagram of autonomous vehicle system showing an autonomous vehicle communicating with another autonomous vehicle and a traffic control system.

FIG. 19 is a block diagram of autonomous vehicle system 1900 showing an autonomous vehicle communicating with another autonomous vehicle and a traffic control system 1902. More specifically, in this particular example, vehicle control unit $100_1$ on host vehicle $104_1$ is communicating with vehicle control unit $100_n$ on host vehicle $104_n$. However, it should be understood that either vehicle could be a fully integrated autonomous vehicle, as opposed to a converted non-autonomous vehicle.

Traffic control system 1902 is shown representationally as a "smart traffic light." However, it should be understood that traffic control system 1902 can be embodied in a wide range of devices capable of communicating with vehicle control units 100. Traffic control system 1902 can be as simple as simple as a single device transmitting its current state (e.g., signal light color, speed limit, etc.) or a wide network of hundreds of devices spanning miles of streets and highways communicating any type of useful information (traffic conditions, weather conditions, emergency conditions, and so on) to any autonomous vehicles within range.

A positioning system 1904 provides positioning signals to control units 100, which enable control units 100 to precisely determine their current positions. In addition, control units 100 can wirelessly communicate with each other either directly or via a communications network 1906. Communication between autonomous vehicles will greatly improve safety and efficiency of traffic flow, among other things. For example, one vehicle being informed of another vehicle's intention to make a lane change could slow down to allow the lane changing vehicle into the lane. As another example, one vehicle can be informed that another vehicle in front of it intends to reduce speed. Virtually any useful information can be communicated between control units 100.

OVERVIEW OF ONE EXAMPLE EMBODIMENT

1. Aesthetically matching with Vehicle and Application
    Sensor unit, antennas and sensor mounts, and panels are designed in such a way that is form fitting, color matching, and attractive for use in marketing and demonstration purposes
    Sensor unit exterior dimensions and form can conform to industrial design and layout presented on FIGS. 1-6.
    Sensor unit exterior logo and paint scheme can conform to FIGS. 1-6.
2. Components/Electronics to be mounted and supported
    Sensor unit can mount to a 2018 Ford Fusion vehicle roof on the left and right edges Computer, LiDAR electronics, cameras, and electronics can be mounted per FIGS. 7-8

Internal component mount and supports can be designed for versatility and ease of reconfiguration Cable harnesses from internal components can be routed and bundled to exit the sensor unit at one rear location through a waterproof cable gland The sensor unit cable pigtail can be 2 ft in length and connectorized 3. Modularity and Serviceability of components and subsystems Assemblies are designed in parts/modules that are easily separable and accessible Parts are designed in such a way that installation, removal, maintenance, and modification have minimal impact/changes on other parts within the system Sensors can retain calibration upon disassembly and reassembly by using locating features such as dowel pins and bosses Mounting feet can be easily separable/replaceable from the main housing of the unit to accommodate changes in vehicle types and roof dimensions 4. Scalability Parts can to be designed for manufacturability using standard shop processes Components and modules are designed for low volume production (less than 100)

Initial prototype quantity is two units sequentially with learning on first unit applied to second unit.

Option of increasing production for high volume manufacturing

5. Reliability

Components are designed to withstand functional and durability testing on public roads 6. Quality Components are designed to use automotive rated parts and materials where practical Workmanship should conform to industry standards and spec TBD (e.g., ISO26262, IPC 610)

7. Adjustability

Side LiDARs can have pitch adjustability of +/−15 degrees from the nominal orientation Center/top LiDAR height adjustability of +/−5 inches Center/top LiDAR does not require pitch adjustability in some embodiments 8. Loads The sensor unit can withstand static, dynamic, aerodynamic, and shock loads common to vehicles traveling 50 mph 90% of the time with occasional highway driving at 75 mph around San Francisco bay area The sensor unit can withstand 2 years of testing without structural failure Safety factor of 2 can be used for design and calculations 9. Aerodynamic and low airflow noise Exterior components and panels are designed to minimize drag and reduce wind noise 10. Upgradability and Vehicle Agnostic Ability to add cameras to side and rear panels Ability to add display (e.g., LCD) to side panels Able to switch out center LiDAR (or any other components) for alternate supplier (pandar 40)

Future upgradability to other vehicles (e.g., Chrysler Pacifica, etc.). Sensor unit main "housing" can remain unchanged while mounting leg/arm can be vehicle specific The description of particular embodiments of the present invention is now complete. Many of the described features may be substituted, altered or omitted without departing from the scope of the invention. For example, alternate object detection devices (e.g. radar), may be substituted for the LiDARs. As another example, alternate modular sensors (e.g., LiDAR, radar, camera, etc.) may be added to interfaces 1202. These and other deviations from the particular embodiments shown will be apparent to those skilled in the art, particularly in view of the foregoing disclosure.

We claim:

1. An autonomous vehicle control system for converting a host non-autonomous vehicle to an autonomous vehicle, said autonomous vehicle control system comprising:
   a housing including a mount, said mount being configured to removably attach said housing to the exterior of a host vehicle, and said housing being attached to said host vehicle via said mount;
   a set of sensors coupled to said housing, a first sensor of said set of sensors being fixed to said vehicle via said housing and said mount, configured to sense at least one physical aspect of said host vehicle's driving environment, and configured to provide sensor output corresponding to said at least one physical aspect of said host vehicle's driving environment;
   an electronic control system removably disposed in said housing, said electronic control system being configured to receive said sensor output and to generate vehicle control instructions based at least in part on said sensor output; and
   a hardware communications interface configured to communicate said vehicle control instructions from said electronic control system to a control module of said host vehicle, said vehicle control instructions configured to control movement of said host vehicle; and wherein
   said housing is configured to allow removal of said electronic control system without changing a position of said first sensor with respect to said vehicle.

2. The autonomous vehicle control system of claim 1, further comprising a tray and wherein:
   said tray is configured to be removably mounted in said housing;
   said electronic control system is mounted to said tray; and
   said electronic control system remains mounted to said tray when said tray is removed from said housing.

3. The autonomous vehicle control system of claim 2, wherein said first sensor remains mounted to said housing when said tray is removed from said housing.

4. The autonomous vehicle control system of claim 3, wherein said first sensor is a LiDAR sensor.

5. The autonomous vehicle control system of claim 2, wherein a second sensor of said set of sensors remains mounted to said tray when said tray is removed from said housing.

6. The autonomous vehicle control system of claim 5, wherein said second sensor is a camera.

7. The autonomous vehicle control system of claim 1, wherein said autonomous vehicle control system is a modular system having at least one physical interface configured to receive a plurality of different sensors.

8. The autonomous vehicle control system of claim 1, wherein said first sensor is a LiDAR sensor.

9. The autonomous vehicle control system of claim 8, wherein:
   said set of sensors further includes a second sensor; and
   said second sensor is a camera.

10. The autonomous vehicle control system of claim 9, further comprising an antenna set mounted to said housing and electrically connectable to said electronic control system.

11. The autonomous vehicle control system of claim 8, further comprising an antenna set mounted to said housing and electrically connectable to said electronic control system.

12. The autonomous vehicle control system of claim 1, further comprising an antenna set mounted to said housing and electrically connectable to said electronic control system.

13. The autonomous vehicle control system of claim 12, wherein said antenna set includes:
    a positioning antenna; and
    a communications antenna.

14. The autonomous vehicle control system of claim 1, wherein said first sensor is a camera.

15. The autonomous vehicle control system of claim 1, wherein said mount includes a plurality of legs extending outward and downward from a central portion of said housing to suspend said housing over the roof-top of said host vehicle.

16. The autonomous vehicle control system of claim 1, wherein said mount is adjustable to facilitate mounting said housing on a plurality of different vehicle models.

17. The autonomous vehicle control system of claim 1, wherein said electronic control system further includes a wireless communication device.

18. The autonomous vehicle control system of claim 1, wherein said electronic control system further includes a positioning device.

19. The autonomous vehicle control system of claim 1, wherein said electronic control system is configured to wirelessly communicate with control systems of other autonomous vehicles.

20. The autonomous vehicle control system of claim 1, wherein said electronic control system is configured to wirelessly communicate with a traffic control system.

\* \* \* \* \*